United States Patent [19]
Adler

[11] 3,821,935
[45] July 2, 1974

[54] HATCH COVER

[75] Inventor: Franklin P. Adler, Michigan City, Ind.

[73] Assignee: Pullman Transport Leasing Company, Chicago, Ill.

[22] Filed: Jan. 5, 1973

[21] Appl. No.: 321,440

[52] U.S. Cl.................... 105/377, 49/317, 114/201, 292/6
[51] Int. Cl............................................ B61d 39/00
[58] Field of Search ..... 220/55 W, 55 N, 57; 292/6; 105/377; 49/317; 114/201

[56] References Cited
UNITED STATES PATENTS

| | | | |
|---|---|---|---|
| 2,408,733 | 10/1946 | Campbell | 105/377 |
| 2,488,524 | 11/1949 | Castellano | 292/6 |
| 3,155,052 | 11/1964 | Carney, Jr. | 105/377 |

Primary Examiner—M. Henson Wood, Jr.
Assistant Examiner—Richard A. Bertsch
Attorney, Agent, or Firm—Hilmond O. Vogel

[57] ABSTRACT

A hatch cover adapted to close a hatch structure opening and including a locking mechanism having a hand wheel projecting through the hatch cover and having a threaded shaft connected thereto. Threaded onto the shaft is a locking spider having a hub and arms extending therefrom with end portions engageable with locking lugs evenly spaced about the inner vertical wall of the hatch. A slotted guide projects downwardly from the hatch cover, the slot therein being of offset or serpentine construction. A follower finger attached to the spider arm supporting hub travels in the slot to thereby provide a rotational movement to the spider as the hub moves vertically upon rotation of the actuating hand wheel and the attached threaded shaft. This spider arm rotation moves the spider into and out of locking alignment with the peripheral locking lugs.

10 Claims, 6 Drawing Figures

HATCH COVER

BACKGROUND OF THE INVENTION

1. Field of the Invention

This invention relates to railway hopper cars having removable hatch covers.

2. Description of the Prior Art

Conventional hatch closing handles consist of three or four rotatable locking handles positioned around the outer periphery of the round hatch and engageable with the hatch to be tightened down to provide a secure seal between the hatch cover and the associated coaming. Thus each handle must be independently tightened requiring time consuming manual operations to secure each hatch cover.

SUMMARY

This invention relates to hatch covers used in railway hopper cars. A hatch cover locking and unlocking device is utilized which includes a rotatable locking handle having a locking spider arm assembly connected to the lower portions thereof, and engageable with locking lugs spaced around the inner periphery of the trough of the hatch coaming. In operation, rotation of the operating handle produces vertical movement of the spider arm assembly into and from engagement with the locking lugs to thereby produce tightening of the hatch cover on its associated supporting coaming. The spider arm assembly is rotatable through the interaction of an attached follower finger and a guide slot which is attached to the trough hatch cover.

It is an object of the present invention to provide a hatch cover locking and sealing arrangement wherein a rotatable handle has a threaded shaft connected thereto and extending through the hatch cover and has a threaded spider arm assembly threadably attached thereto, and with the spider arm assembly rotatable through a limited angular rotation and movable vertically to securely lock the hatch cover in a sealed position.

It is another object of the present invention to provide a locking handle stop device which is slotted to provide for insertion of a car seal.

It is yet another object of the present invention to provide a locking spider arm assembly which is rotatable into alignment with hatch coaming locking lugs and thereafter movable vertically into engagement with the locking lugs to securely pull a hatch cover into a sealed position on the hatch cover coaming.

Also it is an object of the present invention to provide a hatch cover hinge support having a slide hinge opening to thereby provide for relative vertical movement between the hatch support members as the hatch cover is tightened into the sealed position.

These and other objects of the invention will become apparent from reference to the following description, attached drawings and appended claims.

DESCRIPTION OF THE PREFERRED EMBODIMENT

Figure 1:
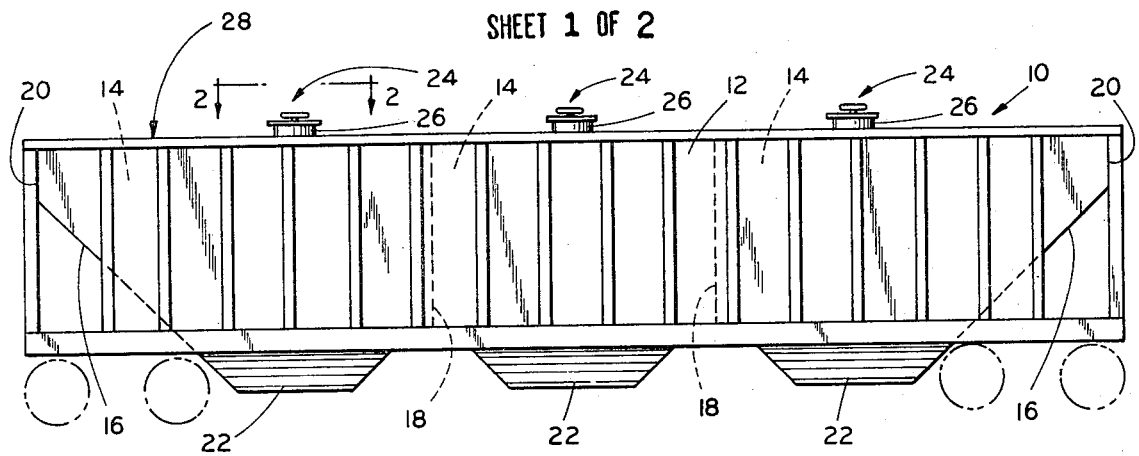
FIG. 1 is a side elevational view of a railway hopper car employing the hatch cover of the present invention.
Figure 2:
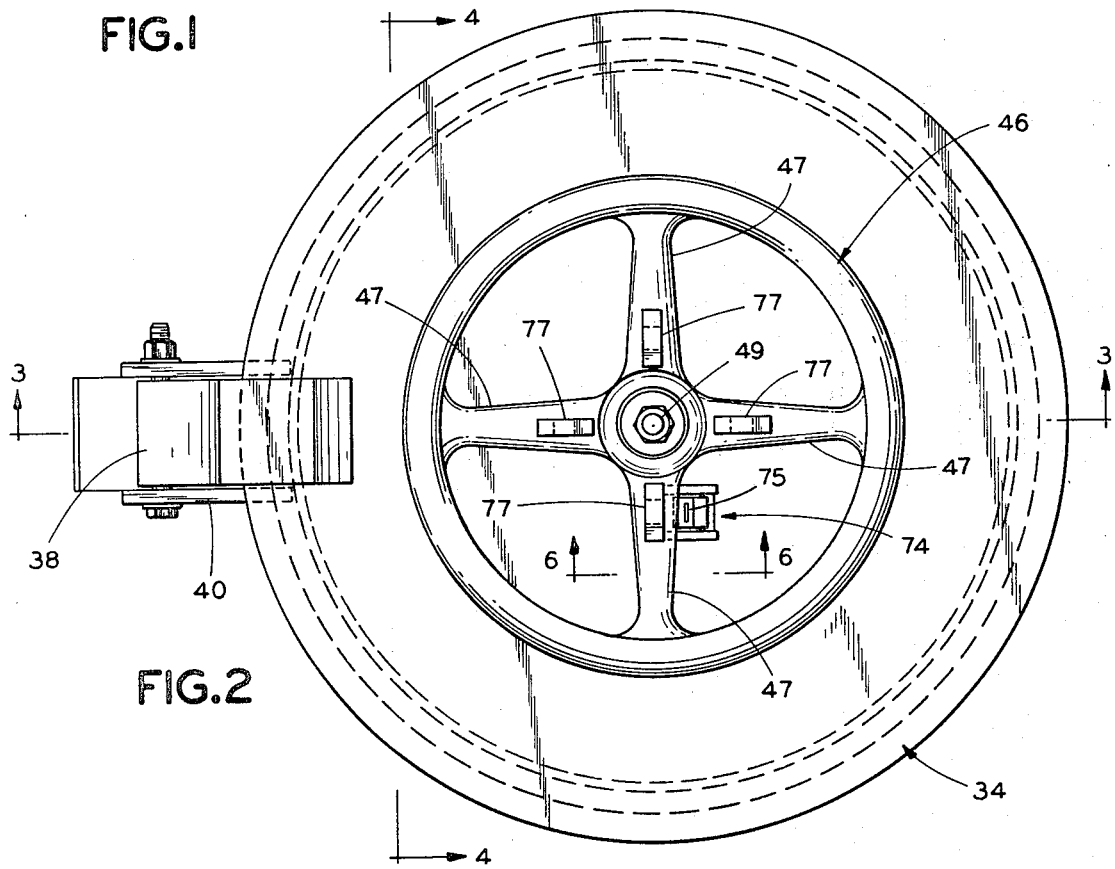
FIG. 2 is a top plan view taken along lines 2—2 of FIG. 1.

Referring now to the drawings and in particular to FIG. 1, there is illustrated a railway hopper car 10 having usual reinforced side wall units 12 and including a plurality of adjacent hoppers designated by the numeral 14. End slope sheets 16 and the intermediate bulkheads 18 extend transversely of the vehicle and form the ends of each hopper 14. The end bulkheads 20 extend vertically from the end portions of the end slope sheets 16 towards the roof unit. Lading within the hoppers is discharged through the discharge openings 22 which generally direct the lading into a pneumatic discharge device or into a discharge pit beneath the supporting tracks. Each hopper 14 includes a top cover or hatch unit 24 which includes vertically extending circular coaming 26 which is attached to and extends upwardly from the hopper car roof 28. The coaming 26 includes a neck portion 30 and a top horizontally extending sealing flange 32 which is integrally formed into the coaming 26.

Figure 3:
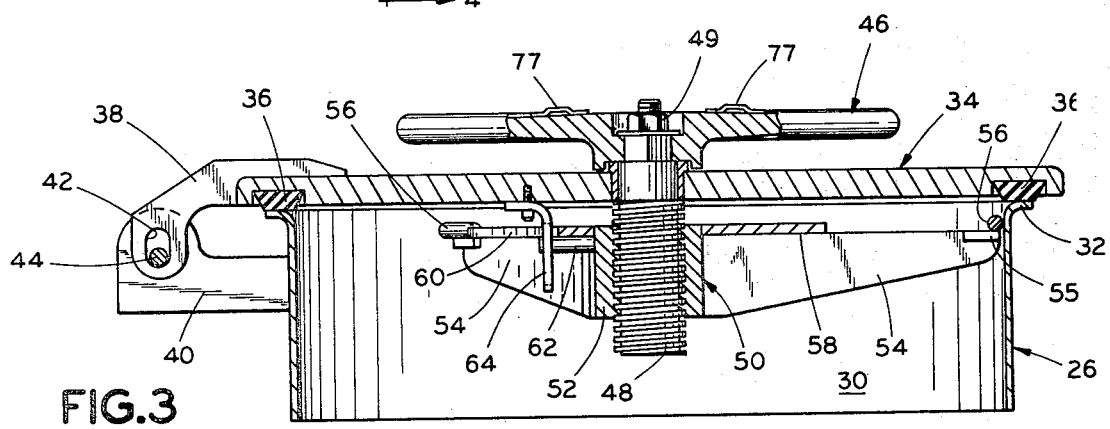
FIG. 3 is a sectional view taken generally along lines 3—3 of FIG. 2.

As noticed from FIG. 3, the hatch covers 34 have a sealing gasket 36 extending around the outer periphery thereof and positioned in a mounting cutout to be in alignment with the top flange 32 of the coaming 26. The hatch cover 34 also includes a pivoting hinge bracket 38 which extends laterally therefrom, and cooperates with a coaming attached hinge portion 40 having the pivot pin 44 to provide for hinged movement during opening and closing of the hatch cover. The cover hinge portion 38 includes a cutout or slot 42 surrounding the hinge pin 44 to thereby provide for generally vertical movement as the hatch cover is locked and sealed onto the supporting coaming 26.

The hatch cover securing unit includes a rotatable hand wheel 46 having a plurality of spokes 47 interconnected to the threaded operating shaft 48. A shaft attaching nut 49 fixedly secures the hand wheel 46 onto the shaft 48. The shaft 48 also includes a lower threaded portion onto which is attached the spider arm assembly 50 of the present invention. A hub 52 is threaded onto the shaft 48 and the connected arms 54 extend radially therefrom. Each arm 54 includes a locking tab 55 attached to the outer portion thereof and movable into locking and tightening engagement with the locking lug or stop 56 which are fixedly attached around the inner periphery of the upstanding coaming 26. The lugs 56 are positioned to be engageable with the arms 54 of the spider assembly 50. The reinforcing connector plate 58 is fixedly attached to the hub 52 and to each arm 54 to provide additional support to the arms as they encounter locking engagement with the associated lugs 56 and are placed in cantilever type of bending.

Figure 4:
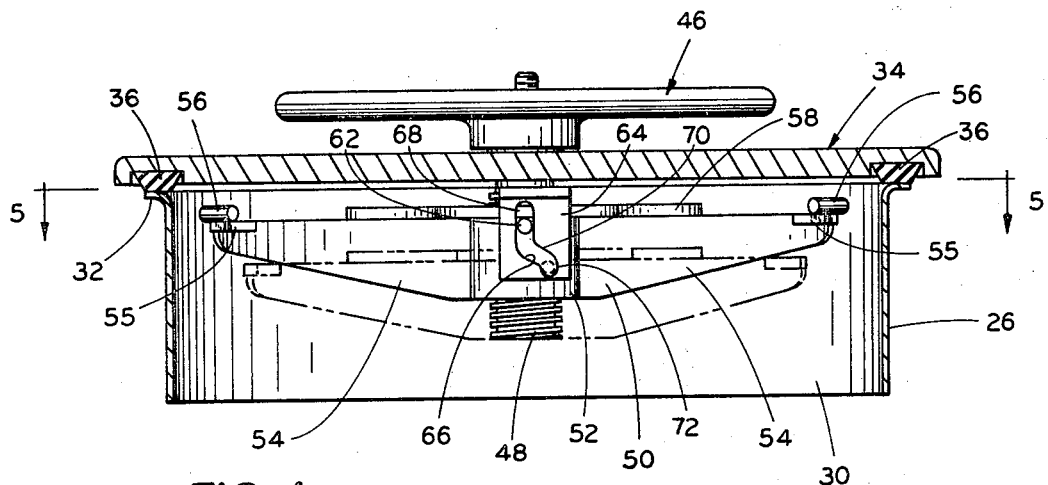
FIG. 4 is a sectional view taken generally along lines 4—4 of FIG. 2.
Figure 5:
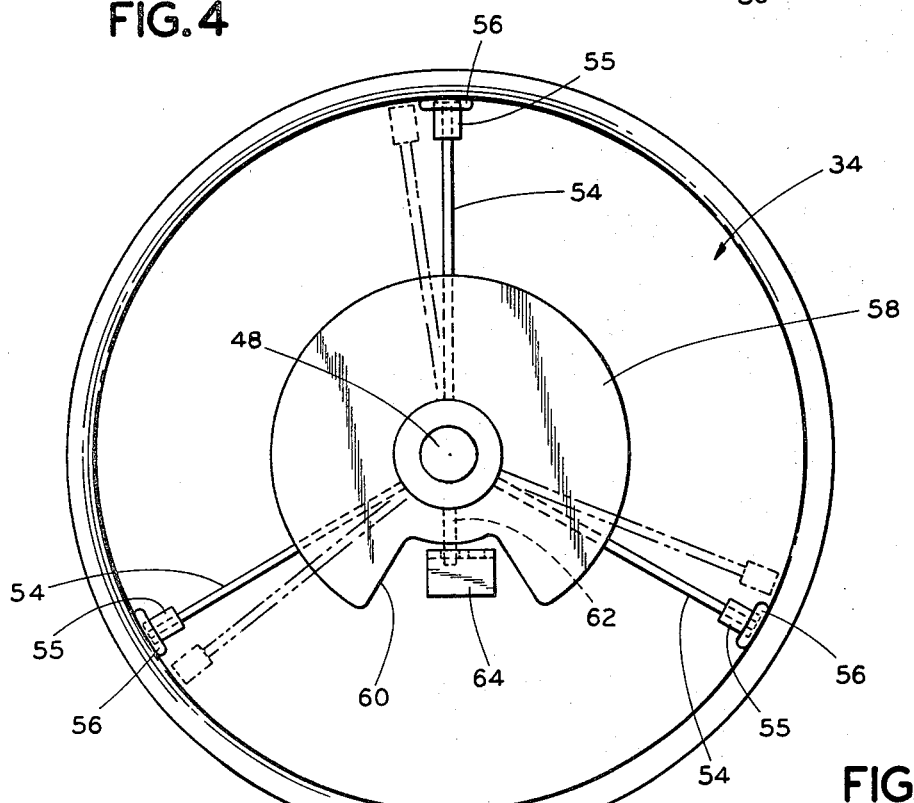
FIG. 5 is a view taken along lines 5—5 of FIG. 4.

Referring now to FIG. 3 it is noticed that the connecting plate 58 includes a cutout portion 60 under which is positioned a follower finger 62 which is attached to the hub 52 and extends radially therefrom. A guide plate 64 is attached to the cover unit 34 and includes a slot portion 66 as indicated in FIG. 4. The slot 66 includes a first or upper slot portion 68 and an inclined portion 70 which connects the first slot 68 with a second lower and offset portion 72. The follower finger 62 fits within the slot 66 and causes a controlled angular rotation of the spider assembly 50 as the spider assembly is moved vertically through the rotation of the threaded shaft portion 48.

Figure 6:
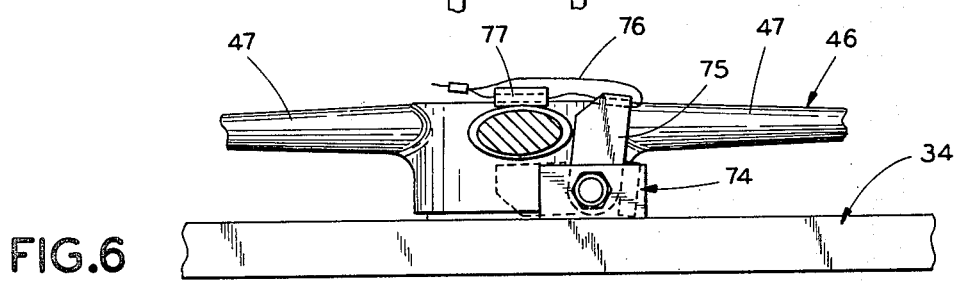
FIG. 6 is a sectional view taken along lines 6—6 of FIG. 2.

Positioned atop the hatch cover 34 is a wheel stop assembly 74. As illustrated in FIG. 6, this unit 74 includes a pivoting stop latch 75 which is movable from an on-the-hatch unlocked position to a substantially vertical and upright locked position whereby it will abut a spoke of the hand wheel 46 and prevent loosening of the hand wheel thereby keeping the hatch cover tight on the hatch coaming. A car seal 76 may be inserted into a slot in the latch 75 and extend through a seal connecting tab 77 which is attached to each of the spokes 47 of the hand wheel 46.

THE OPERATION

When the cover unit 34 is in a closed position whereby the cover gasket 36 is positioned atop the top horizontal flange 32 of the hatch coaming, rotation of the hand wheel 46 will provide locking of the hatch cover in a sealed position. By rotating the hand wheel 46 after the hatch cover 34 is closed the spider assembly 50 will move upwardly towards the hand wheel 46 and, as noticed in FIG. 4, this upward movement will also be accompanied by an angular rotation of the arms 54 of the spider assembly 50. As the spider assembly 50 moves upward it is guided in its rotational angular movement by the follower finger 62 moving through the slot 66 of the guide plate 64. This initial vertical upward movement of the spider arm assembly 50 permits a degree of angular rotation so that the locking arm will come into alignment with the locking lugs 56 which are spaced around the inner periphery of the attached coaming 26. When the spider arms 54 are in alignment with the locking lugs 56 further rotation of the hand wheel 46 provides vertical movement of the spider assembly 50 whereby contact will be initiated between the locking tabs 55 and the locking lugs 56 and additional rotation of the hand wheel 46 provides a tightening compression of the sealing gasket 36 to completely and efficiently seal off the hatch opening.

To open the hatch, the hand wheel 46 is rotated in an opposite direction thereby forcing the spider assembly downwardly whereby contact between the locking tabs 55 and the locking lugs 56 will be terminated. After disengagement occurs there will be a rotation of the spider assembly 50 as the follower finger 62 moves downwardly and laterally through the slot 66.

Thus it is noticed that the hatch cover locking arrangement of the present invention provides an efficient and reliable device for securely closing a hatch cover whereby a single locking handle is rotated to lock and seal each hopper.

When contact occurs between the locking tabs 55 and the locking lugs 56 the gasket 36 will begin to compress on the top horizontal flange of the hatch coaming 32. After the operator detects the contact has occurred he may tighten the rotating handle further and when a spoke 47 is adjacent the stop assembly 74 the operator may rotate the latch 75 into the vertical position and thereby hold the hand wheel in the locked position.

The spider arms 54 have cantilever beam strength to provide sufficient sealing engagement between the hatch cover 34 and the associated coaming to prevent entry of contaminants into the hoppers 14. The tabs 55 of the spider arm 54 provide a large wear surface for even contact with the coaming locking lugs 56 to prevent twisting of the spider arms 54, as the spider arm assembly 50 is drawn upwards against the coaming locking lugs 56 and each spider arm undergoes cantilever bending beam loading.

The foregoing description and drawings merely explain and illustrate the invention and the invention is not limited thereto, except insofar as the appended claims are so limited, as those skilled in the art who have the disclosure before them will be able to make modifications and variations therein without departing from the scope of the invention.

What is claimed is:

1. A railway hopper car having a hatch opening and a cover member positioned thereon, said cover having a locking mechanism, the improvement comprising:

a hand wheel positioned centrally of the hatch cover and having an operating shaft projecting through said cover and said shaft having a threaded portion;

locking stop means positioned about said hatch opening;

a cover locking spider assembly having a hub threaded on the shaft and also having hold-down arms extending from said hub and engageable with said locking stop means;

said locking mechanism including guide surface means rigidly connected to said cover and projecting downwardly into said hatch opening, and follower finger means supported on said hub to thereby provide vertical and rotational movement of the spider assembly during rotation of said hand wheel and the associated threaded operating shaft;

said guide surface means including an inclined portion to provide limited rotation of the locking spider assembly during vertical movement of the hub on said threaded portion of the operating shaft, said limited rotation of the locking spider rotating the hold-down arms and moving the same vertically into and from vertical alignment with the locking stop means.

2. The invention according to claim 1, and:

said hopper car having hatch coaming defining said hatch openings and said locking stop means attached to the inner periphery of said coaming;

each cover hold-down arm forming a cantilever beam extending from said hub and having a horizontally extending tab portion engageable with the coaming mounted stop means to thereby provide cantilever bending of the hold-down arms during closing of the hatch opening.

3. The invention according to claim 1, and:

said guide surface means comprising a slotted member attached to said hatch cover;

said finger means attached to said hub and having a portion extending into said slotted member.

4. The invention according to claim 1, and:

a handle stop latch pivotally attached to said hatch cover member and rotatable from an inoperative position below said handle to an upright position intersecting a portion of said handle;

said stop latch having a car seal attaching opening.

5. A railway hopper car with a plurality of adjacent hoppers and a roof unit having circular latch openings for admitting lading into the hoppers, and hatch coaming extending upwardly of the hatch openings and forming seating and sealing means for pivotally movable hatch covers to open and close said hatch openings, the improvement comprising:

operating shaft means extending through the central portion of said hatch cover and said shaft having a threaded portion and an operating handle attached thereto;

a hatch locking spider assembly having a centrally disposed hub attached to the operating shaft and having a plurality of locking arm means extending outwardly therefrom and said spider mounted for vertical reciprocable movement upon rotation of said operating shaft means;

a spider guide attached to said hatch cover and having guide surface means including a vertically extending portion and also including spider rotating angled guide surface portions;

locking arm engaging lug means attached to the inner periphery of said hatch coaming;

said locking spider assembly having a follower finger portion co-acting with said hatch cover mounted spider guide to thereby provide guided rotational movement of the spider assembly as the follower portion moves cooperatively along the angled portion of the guide surface means, said rotational movement of the spider assembly aligning the locking arms of the spider with the associated locking lugs, and further, sealing of the hatch cover being provided through engagement of the spider assembly with the coaming mounted lug means as said spider mounted follower finger portion moves cooperatively along the vertically extending portion of said guide surface means during rotation of the operating shaft means.

6. The invention according to claim 5, and:
said operating handle having a plurality of spokes extending radially from the shaft connected portion;

a handle stop means attached to the hatch cover and comprising a pivoting latch movable upward from a position on the hatch cover to a generally vertical position intersecting the spokes;

said stop means having car seal connecting opening.

7. The invention according to claim 5, and:
said hub including a threaded portion and having said locking arm means extending radially therefrom;
said locking arm means having lug engaging tab members to thereby provide for cantilever beam bending of the spider arms.

8. The invention according to claim 5, and:
hinge means connecting each hatch cover with the associated coaming and said hinge means including a hinge pin positioned in an enlarged hinge opening to thereby allow limited vertical movement of the hatch cover.

9. The invention according to claim 5, and:
said spider guide means being a slotted member extending downwardly from the hatch cover and having a guide slot formed therein;
said guide slot including a first vertically extending portion and a second inclined portion;
said follower finger positioned within said guide slot to thereby provide limited rotation of the spider arm assembly during vertical movement of the follower finger in the second inclined portion of the guide slot.

10. The invention according to claim 5, and:
a horizontally disposed spider arm reinforcing plate interconnecting the spider arms and having a portion connected to said hub.

* * * * *